United States Patent [19]
Jolivet

[11] Patent Number: 6,008,719
[45] Date of Patent: Dec. 28, 1999

[54] ELECTRICAL CONTROL DEVICE WITH CROSSTALK CORRECTION, AND APPLICATION THEREOF TO MAGNETIC WRITE/READ HEADS

[75] Inventor: Denis Jolivet, Les Clayes S/S Bois, France

[73] Assignee: Thomson-CSF, Paris, France

[21] Appl. No.: 08/943,229

[22] Filed: Oct. 3, 1997

Related U.S. Application Data

[63] Continuation of application No. 08/493,159, Jun. 21, 1995, abandoned.

[30] Foreign Application Priority Data

Jul. 1, 1994 [FR] France .................................. 94 08160

[51] Int. Cl.$^6$ ................................................. H01C 1/012
[52] U.S. Cl. .......................... 338/309; 360/124; 338/320; 338/61
[58] Field of Search .................. 338/260, 320, 338/325, 327, 322, 328, 334, 309, 203, 61–63; 336/147, 180; 360/124, 2

[56] References Cited

U.S. PATENT DOCUMENTS

| | | | |
|---|---|---|---|
| 2,994,848 | 8/1961 | Rayburn | 338/328 |
| 3,165,592 | 1/1965 | Brette | 360/124 |
| 3,601,745 | 8/1971 | Helgeland | 338/203 |
| 3,906,430 | 9/1975 | Hareyama et al. | 338/320 |
| 3,916,366 | 10/1975 | Jefferson | 338/21 |
| 4,072,993 | 2/1978 | Nomura et al. | 360/124 |
| 4,549,189 | 10/1985 | Shiratsuki | 347/203 |
| 4,723,130 | 2/1988 | Takanashi et al. | 347/206 |
| 4,738,871 | 4/1988 | Watanabe et al. | 338/309 |
| 4,750,260 | 6/1988 | Takeno et al. | 29/611 |
| 5,504,471 | 4/1996 | Lund | 338/309 |
| 5,506,494 | 4/1996 | Ito et al. | 338/325 |

FOREIGN PATENT DOCUMENTS

| | | |
|---|---|---|
| 0 406 052 A1 | 1/1991 | European Pat. Off. . |
| 0 467 737 A1 | 1/1992 | European Pat. Off. . |
| 2 699 722 | 6/1994 | France . |
| 7510306 | 11/1975 | Netherlands . |
| WO 94/15332 | 7/1994 | WIPO . |

OTHER PUBLICATIONS

Patent Abstracts of Japan vol. 18, No. 387 (p–1773) Jul. 20, 1994 & JP6110080(Seiko Epson Corp.)Apr. 22, 1994.
Patent Abstracts of Japan vol. 14, No. 561 (p–1142)Dec. 13, 1990 & JP2239415(Canon Inc.) Sep. 21, 1990.
Patent Abstracts of Japan vol. 17, No. 542 (e–1441) Sep. 29, 1993 & JP5152580(Olmpus Optical Co. Ltd.) Jun. 18, 1993.
Database WPI Section E1, Week 9408, Derwent Publications Ltd., London, GB; Class U12, An 94–065179 & US–A–5 289 410 (California Inst. of Techn.) Feb. 22, 1994.

*Primary Examiner*—Michael L. Gellner
*Assistant Examiner*—Karl Eastham
*Attorney, Agent, or Firm*—Oblon, Spivak, McClelland, Maier & Neustadt, P.C.

[57] ABSTRACT

This electrical control device with crosstalk correction includes several devices each electrically controllable by a limiter resistor. The current limiter resistors are resistive limiter elements in plane layers positioned on a first substrate face. At least one resistive coupling element is positioned transversally to each resistive element and interconnects these resistive elements.

Applications include electrical control of electromagnetic or electrooptical devices, notably the control of magnetic write/read heads.

2 Claims, 6 Drawing Sheets

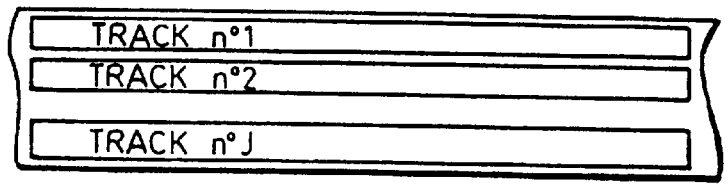
FIG.1 *PRIOR ART*
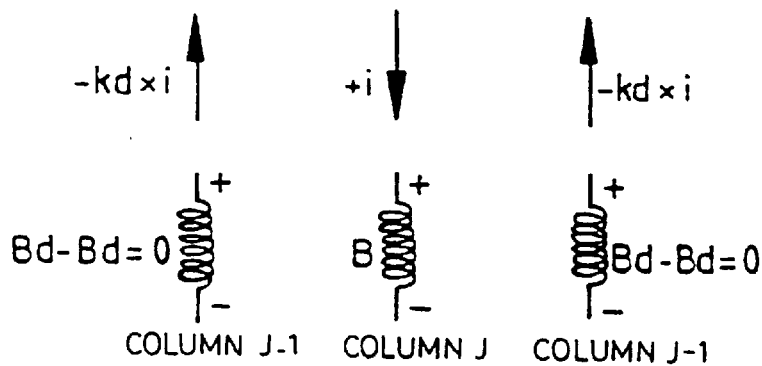
FIG.2 *PRIOR ART*
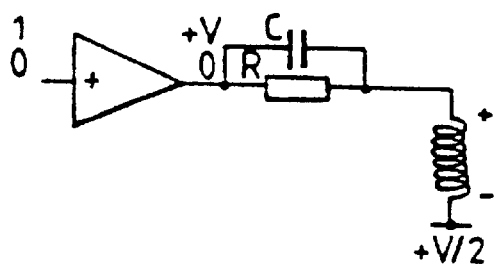
FIG.3 *PRIOR ART*

SECTION a-a

ELECTRICAL CONTROL DEVICE WITH CROSSTALK CORRECTION, AND APPLICATION THEREOF TO MAGNETIC WRITE/READ HEADS

This application is a continuation of application Ser. No. 08/493,159, filed on Jun. 21, 1995, now abandoned.

BACKGROUND OF THE INVENTION

The invention relates to an electrical control device with crosstalk correction and to its application to magnetic write/read heads.

It can be applied to a source or a matrix of electrically controllable devices such as electromagnetic devices (magnetic heads for example) or optical devices to compensate for the crosstalk that may exist between neighboring devices.

In the case of magnetic write/read heads, the invention consists of a physical and passive device associated with an arrangement of elements enabling electrical compensation for the magnetic crosstalk that exists in the component for multitrack writing on magnetic media.

This device replaces a set of passive components (resistors and capacitors associated with their connection equipment) positioned between the electronic circuitry used to generate the write currents and the coils of the writing component.

The invention is applicable in the context of a system for the writing and reading of data elements on magnetic media where the physical format for writing data elements on tape is of the parallel multitrack type as shown in FIG. 1.

When these tracks are very close to one another, the component used for writing according to this format shows crosstalk in writing that becomes detrimental to the quality of the data elements written.

Magnetic crosstalk in writing results in a condition where the data elements normally designed for a track J are written partially on the neighboring tracks J−1 and J+1.

For example, a magnetic multitrack recorder has a large number of magnetic heads (1024 for example). This makes it possible to write 1024 tracks on a tape with a height of 12.54 mm. A device such as this has a matrix structure. The 1024 magnetic gaps are distributed in a parallelogram 16 columns long and 64 rows high.

The geometrical form of this parallelogram (essentially the angle) is carefully chosen to achieve the writing on the 1024 tracks on the magnetic tape adjacently without intertrack overlapping.

Each column and each row has an electrically addressed coil. In nominal operation, the currents flowing through the columns and the rows do not generate a field sufficient for writing on tape at the position of the gaps that correspond to them. By contrast, at the intersection of a column and a row, the additive action of the currents enables the generation, in the corresponding gap, of a field that is sufficient for the writing of a data element on tape.

In reality, when a column (or line) J is electrically addressed by a current +I, a magnetic field B proportional to this current appears in all the gaps of the column (or of the row) that is excited:

B=k×I, where k represents the efficiency of the write head.

Owing to the leakages from the magnetic circuits of the component, a parasitic field of crosstalk Bd which is a positive proportion of B also appears at the gaps located in the neighboring columns.

Bd=kd×B where kd represents the coefficient of crosstalk between columns of the write head.

When, in nominal operation, these fields of crosstalk that exist for all the columns and rows of the head get superimposed on those created by the currents, any track J is partially written on with the signals of the physically neighboring tracks.

Crosstalk in writing is very harmful to the quality of the channel because, during the re-reading, the data elements are stained with a noise correlated with the neighboring tracks which causes substantial deterioration in the signal-to-noise ratio.

Since the process that gives rise to crosstalk in the component is linear and reciprocal (Bd=kd×k×I), it is possible to cancel the field Bd on the columns J−1 and J+1 by sending a current −kd×I with reverse polarity into these columns during the addressing of the column J by the current I (see FIG. 2).

From an electrical point of view, this approach is complicated because it is necessary, in a synchronous manner, to generate currents having opposite polarities. Hence it is necessary to have symmetrical and linear control circuits since the current is proportional to kd.

This approach cannot be envisaged for reasons of power dissipation, for the number of control circuits needed is high (I lines+J columns). It is therefore simplified two-state control circuits (0 volt→+V volt) that supply the coil through a resistor.

FIG. 3 shows the electrical assembly used. The capacitor C, having a low value, is designed to increase the build-up time of the current in the coils. The common point of the coils fixed at +V2 enables the creation of the currents +I and −I from one and the same voltage.

The constraint on the nature of the control circuits therefore dictates another approach that enables the correction of magnetic crosstalk in keeping with the requirements as regards polarity.

The French patent application No. 92 15472 describes a device providing for coupling resistors to compensate for crosstalk.

In the basic configuration, all the coils of the component have an identical magnetic face, i.e. a current +I would give rise to a field +B=+k×I in all the gaps. Under these conditions, the correction current remains Id=−kd×I with the opposite sign.

In alternating the magnetic phase of one in every two coils throughout the component, hence with one coil wound in one direction and then the next one in the opposite direction, it is also necessary to alternate the sign of the current to generate a magnetic field with the same sign on all the gaps.

This principle is applied to all the rows and columns of the components. It will be observed, in FIGS. 4a to 4d, that an electrical information element +1 truly gives a magnetic field +B in the gap.

In this configuration, the crosstalk created by the coil J is corrected by the injection, into J−1 and J+1, of the current that gives rise to a field that is the reverse of the crosstalk field at J−1 and J+1. The reversal of magnetic polarity from one coil to another determines a correction current at J−1 and J+1 having the same sign as the current in J since the phase opposition is achieved by wiring.

The correction of crosstalk of the component can then be done solely with passive components as shown in FIG. 5. The crosstalk correction resistors Rd shunt a part kd of the current of J to J−1 and J+1 and give rise to the magnetic field which cancels the parasitic field.

Should a symmetrical control circuit be made for reasons of build-up time of the current in an inductive impedance, the number of components is doubled. The diagram of such a circuit is shown in FIG. 6.

In the case of a matrix type magnetic head with 1024 writing gaps distributed over 16 columns and 64 rows, the electrical assembly uses 64 simple control circuits for the rows and 16 control circuits in a bridge arrangement for the column. This configuration requires:

64+2×16=96 control circuits

64=2×16=96 resistors for the control of the current of the coils

2×64+4×16=192 crosstalk correction resistors.

The writing component requires a network of 288 resistors in order to work accurately.

SUMMARY OF THE INVENTION

An object of the invention is the simplifying of the designing and making of the crosstalk correction circuits and even the reduction of the number of resistors necessary.

The invention therefore relates to an electrical control device with crosstalk correction comprising several devices each electrically controllable by a limiter resistor, wherein the current limiter resistors are resistive limiter elements formed by plane layers positioned on a first face of the substrate and wherein said device also comprises at least one resistive coupling element positioned transversally with respect to each resistive element and interconnecting these resistive elements.

The invention also relates to a device comprising:

a first set of resistive coupling elements each connecting one input of an even-order resistive limiter element to an output of an odd-order neighboring resistive limiter element;

a second set of resistive elements insulated from the first elements each connecting an output of an even-order resistive limiter element to an input of an odd-order resistive limiter element.

The invention can be applied to the control of a write/read matrix head.

BRIEF DESCRIPTION OF THE DRAWINGS

The different objects and features of the invention shall appear more clearly from the following description and from the appended figures of which:

FIGS. 1–3, 4a, 4b, 4c, 4d, and 5–6 show electromagnetic control devices known in the prior art;

MORE DETAILED DESCRIPTION

The device proposed to replace the set of current and crosstalk limiter resistors is a resistive surface having an anisotropy of resistivity along its X and Y axes. This anisotropy is obtained either by a shape factor of the device or by a choice of resistive patterns intersecting each other at 90°.

The simplest structure that fulfils the function is a rectangular surface having a certain value of ohmic resistance per "square".

Figure 6:
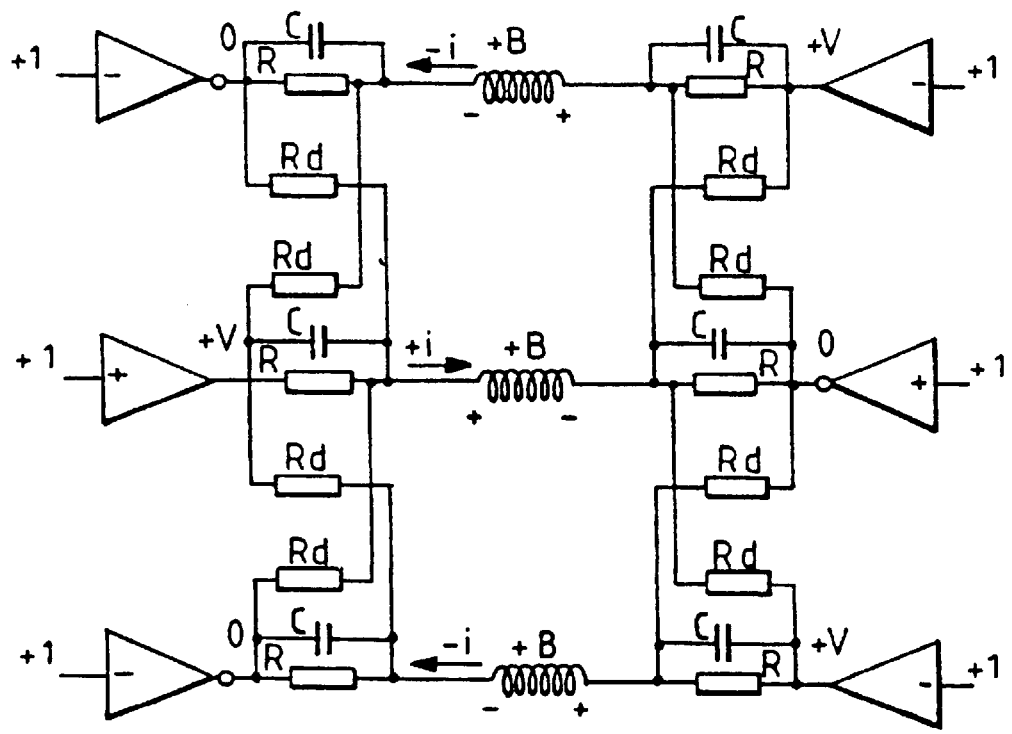
Figure 7:
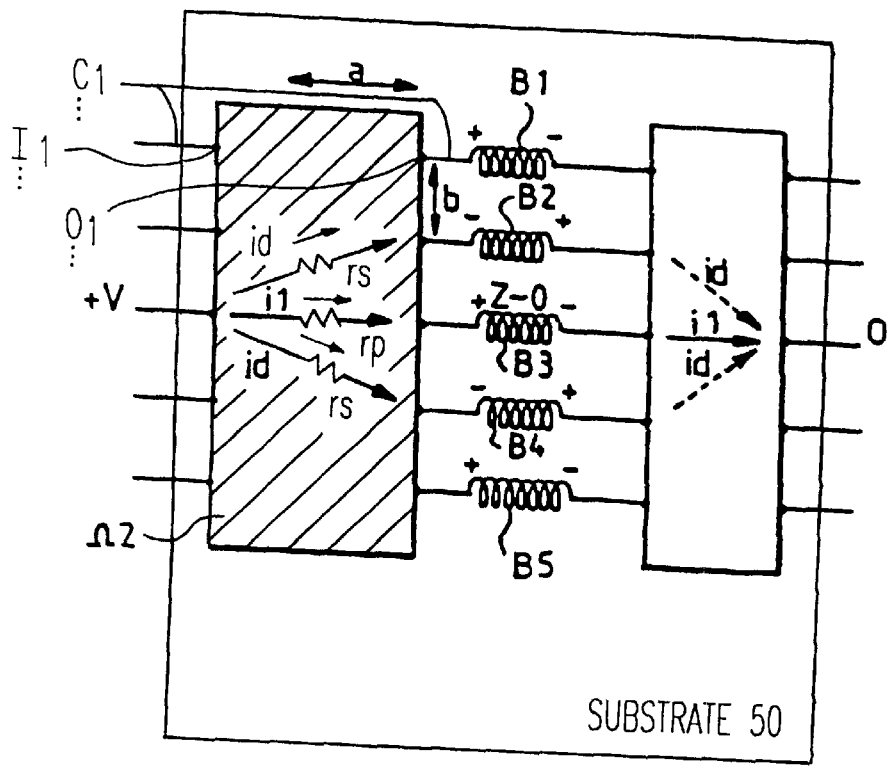
FIG. 7 shows a general example of the control device with crosstalk correction according to the invention.

FIG. 7 shows the structure in a so-called bridge configuration. The electromagnetic devices to be controlled are represented by the coils B1 to B5. As can be seen by the signs "+" and "−" associated with their access points, these coils have alternating directions of coiling as was explained with reference to FIGS. 5 and 6. Control circuits send the voltages +V and 0 at low impedance to each of the inputs of the network. The length "a" set the dimension of the resistor $\Omega 2$, thus defining a primary resistance $r_p$ in series with each coil, which will carry out the current limitation il in each coil having very low impedance Z (also referred to as resistive limiter elements $r_p$) while the inter-contact distance "b" determines the proportion id of the main current that is shunted towards the neighboring coils (via resistive shunt elements $r_s$), by defining a shunt resistance $r_s$ connecting adjacent coils. Each of the coils $B_1 \ldots B_5$ have corresponding control conductors $C_1 \ldots C_5$ for conducting currents, and respective input $I_1 \ldots I_5$ and output $O_1 \ldots O_5$ nodes on resistor $\Omega 2$. $\Omega 2$ and the electromagnetic devices are shown on substrate 50.

This structure achieves an analog mixing of current between coils.

In the operational configuration of the matrix head, the 288 resistors are replaced by three resistive mixers, one for the set of 64 rows and two for the 16 columns that are addressed in a bridge arrangement.

Figure 8:
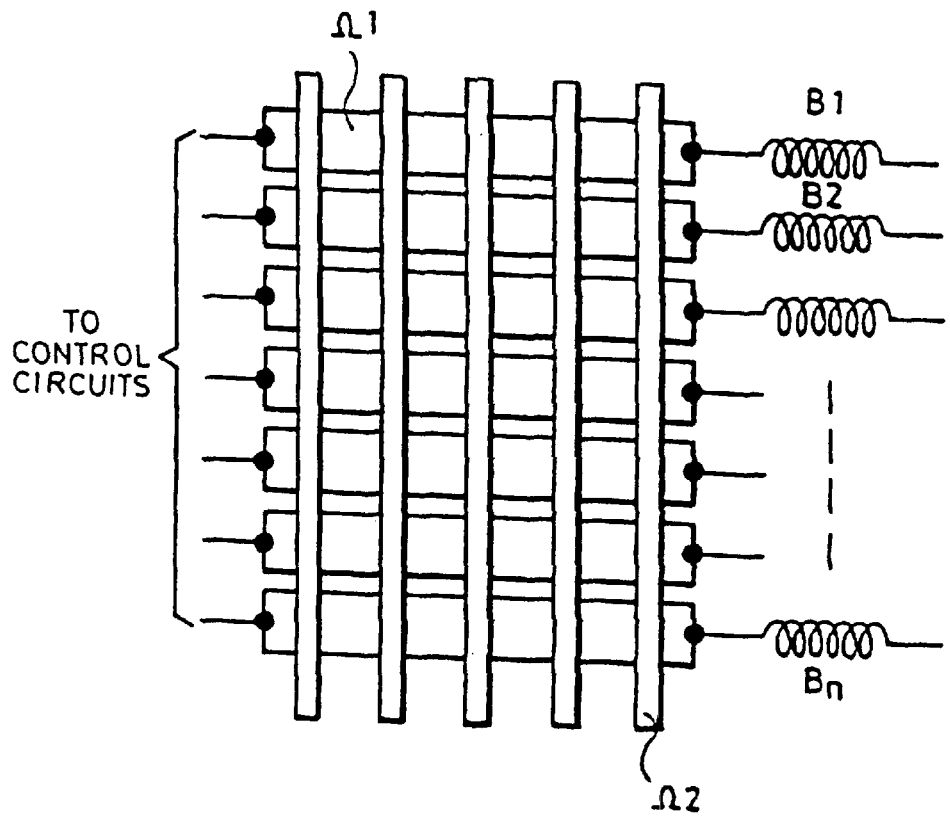
FIG. 8 shows another embodiment of the control device according to the invention.

Depending on the correction coefficient kd to be achieved, the ratio of the dimensions (a:b) which determines the kd of the device may lead to a sizing of the unit that is incompatible with the environment of the component. In this case, the structure made is a structure formed by two intersecting resistive layers in contact each formed by parallel tapes having different values of resistance as shown in FIG. 8.

The geometrical sizing of the device is then independent of its electrical characteristics.

The elements such as $\Omega 1$ represent resistive current limiter elements connecting each electromagnetic device B1 to B$n$ to be controlled to the control circuits.

The element such as $\Omega 2$ shown perpendicularly to $\Omega 1$ is a resistive coupling element in electrical contact with each resistive current limiter element $\Omega 1$.

According to one embodiment, the resistive elements $\Omega 1$ are made in a thin film or thick film on a substrate wafer. The elements $\Omega 2$ are also made in a thin or thick film on the elements $\Omega 1$ and on the substrate wafer.

The calibration of the sizes in thickness and notably in width enables the adjustment of the values of the resistors. Furthermore, according to FIG. 8, the number of elements $\Omega 2$ enables the adjustment of the coupling.

Figure 9:
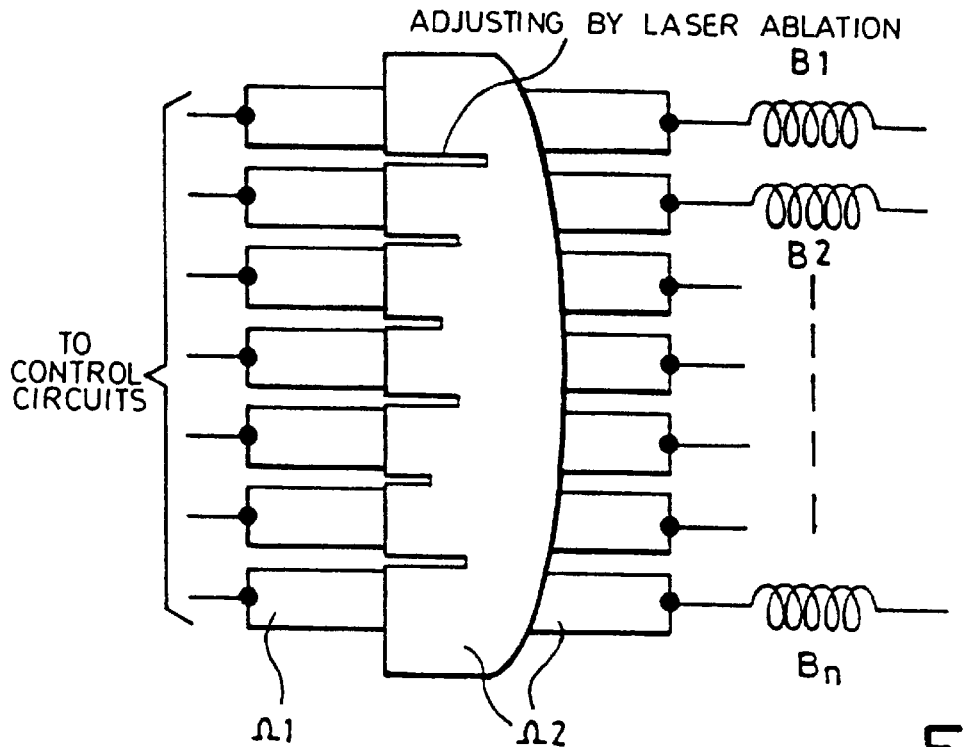
FIG. 9 shows an alternative embodiment of the device of FIG. 8.

The resistive coupling element may be preformed, as shown in FIG. 9, to take account of a constant characteristic of the component to be corrected. In FIG. 9, the element $\Omega 2$ has a shape matching the couplings to be made. Furthermore, between the resistive elements $\Omega 1$, there is provision for slots in the element $\Omega 2$ to adjust the resistive couplings between elements $\Omega 1$ as required.

In an industrial context, the device may be adjusted by laser, this being done at each coil, by the partial removal of the resistive layers for the adjusting of the main current and of the crosstalk correction currents.

Figure 4A:
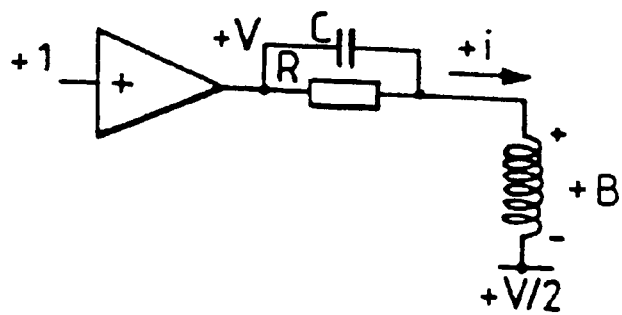
Figure 4B:
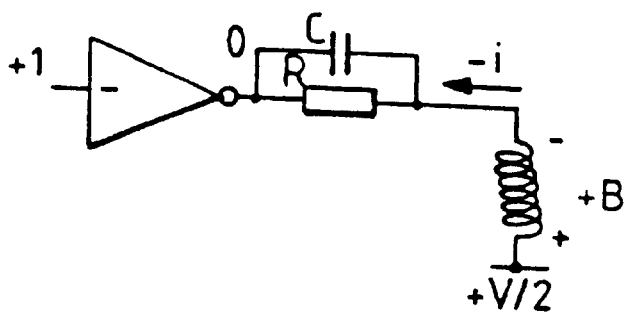
Figure 4C:
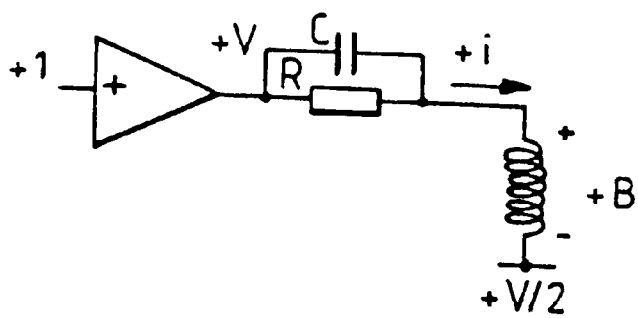
Figure 4D:
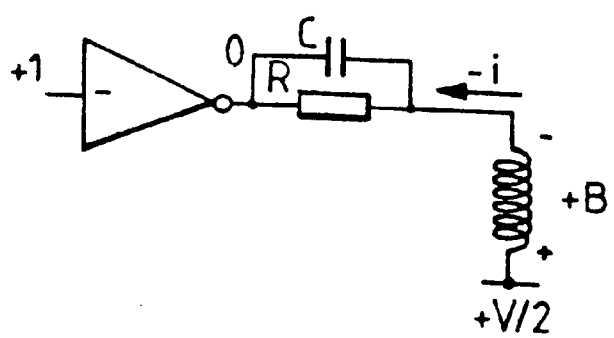
Figure 5:
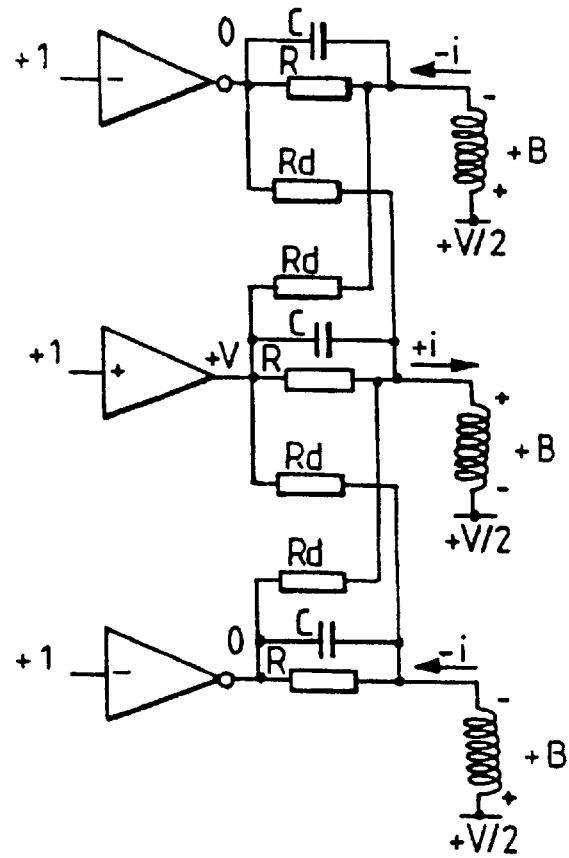
Figure 10A:
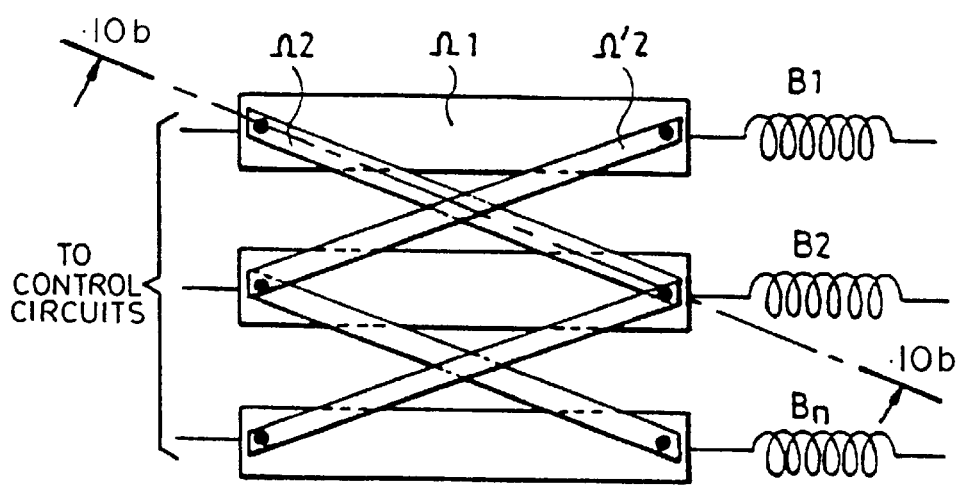
FIGS. 10a and 10b show a more complex embodiment of the control device according to the invention.
Figure 10B:
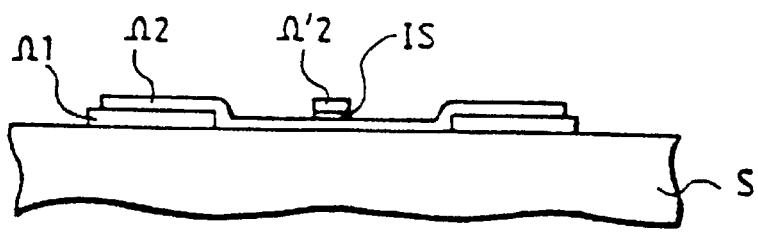

FIGS. 10a and 10b show an alternative embodiment of the invention in which there is provision for resistive elements such as Ω2 and Ω'2 connecting the access point of each resistive element Ω1 on the control circuit side to the access point on the coil side of the immediately neighboring resistive elements. Thus a resistive coupling is obtained between input and output as shown in FIGS. 5 and 6.

FIG. 10b shows a sectional view which brings out the fact that the resistive elements Ω2 and Ω'2 are insulated from one another by a layer of insulator I1.

The need to obtain current build-up times in the coils makes it necessary to add on capacitors in parallel with the current limiter resistors. The sectional view of FIG. 11 shows a type of embodiment that enables this component to be integrated into the device.

The capacitive coupling is obtained by two facing metallization layers. This device is reproduced for each coil command.

Figure 11:
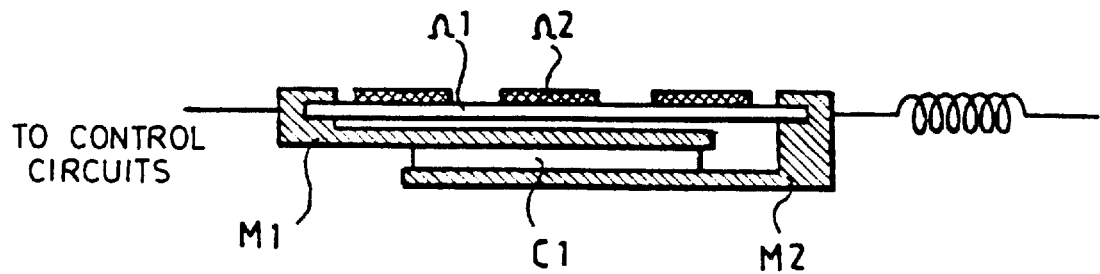
FIG. 11 shows a control device comprising a capacitor in parallel with each resistive current limiter element.

FIG. 11 shows a simplified view of an embodiment such as this. It is applied to the device of FIG. 8 comprising several resistive coupling elements Ω2.

On the back of the element Ω1, this device has a first metallization M1 connected to one end of the element Ω1 and a second metallization M2 connected to the other end of the element Ω1. Between the two metallizations, a dielectric material C1 is provided.

According to a more practical embodiment, the resistive elements Ω1 and Ω2 may be made on one face of the substrate and the capacitors constituted by the metallizations M1 and M2 and the dielectric C1 may be made on the opposite face of the substrate.

Figure 12:
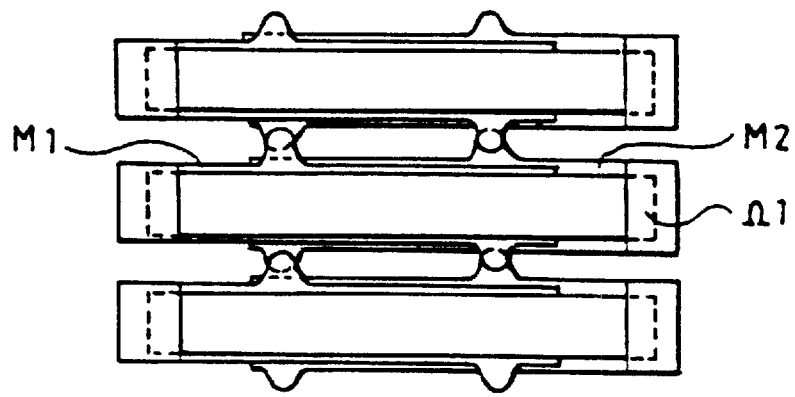
FIG. 12 shows a control device comprising capacitors in parallel with the resistive coupling elements.

FIG. 12 shows a device according to the invention in which there is provision for coupling capacitors between the inputs of the resistive elements Ω1 and the outputs of the neighboring resistive elements. In this FIG. 12, the resistive coupling elements Ω2 have not been shown.

The making of these capacitors uses the metallizations M1 and M2 described with reference to FIG. 11.

Each metallization M1 associated with a resistive element Ω1 has a conductive tongue L1, L'1 on each side of the metallization that extends towards the metallization M1 of the neighboring resistive element.

The same is true of each metallization M2 which has tongues N1 and N'1.

Each tongue L1, L'1 of a resistive element is located above a tongue N1 or N'1 of a neighboring resistive element and the two tongues are separated by dielectric material so as to form a capacitor. Thus, capacitors are made in parallel with the resistive coupling elements Ω2 whose value depends on the facing surface.

Figure 13:
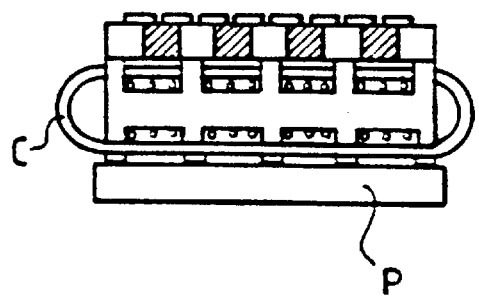
FIG. 13 exemplifies an application to a matrix head.

FIG. 13 exemplifies the integration of the control device described here above with a matrix magnetic head made in the form of a wafer P. One face of the wafer P1 has the poles of the magnetic heads and the gaps. This face therefore serves as an active face. The above-described control device made in the form of a wafer P2 is attached to the main face of the wafer P1 opposite the active face.

A matrix-type magnetic head such as this can be made as described in the French patent application No. 2 648 940 and a wafer P2 is attached to it. Then the coils have to be connected to the circuits of the wafer P2.

What is claimed is:

1. An electrical control device with crosstalk correction, comprising:
    a pluralty of parallel inductive means;
    conductive means formed on a substrate and connected to said plurality of inductive means for eliminating crosstalk between said plurality of inductive means, said conductive means providing an effective series resistance to each corresponding one of said plurality of parallel inductive means and said conductive means also providing a plurality of effective shunt resistances in order to couple adjacent ones of said plurality of parallel inductive means whereby said shunt resistances function to pass to said plurality of inductive means shunt currents of a magnitude sufficient to cancel crosstalk between said adjacent ones of said plurality of parallel inductive means and wherein said plurality of inductive means are coils with adjacent ones of said coils being wound in opposite directions.

2. The control device according to claim 1 wherein said provided series resistances are parallel to one another.

* * * * *